US008432897B2

(12) United States Patent
Bangor et al.

(10) Patent No.: US 8,432,897 B2
(45) Date of Patent: Apr. 30, 2013

(54) SYSTEM AND METHOD OF PRESENTING CALLER IDENTIFICATION INFORMATION AT A VOICE OVER INTERNET PROTOCOL COMMUNICATION DEVICE

(75) Inventors: Aaron W. Bangor, Austin, TX (US); Jeffrey L. Brandt, Cedar Park, TX (US); Douglas F. Reynolds, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1433 days.

(21) Appl. No.: 11/214,471

(22) Filed: Aug. 29, 2005

(65) Prior Publication Data

US 2007/0047519 A1 Mar. 1, 2007

(51) Int. Cl.
*H04L 12/66* (2006.01)
*H04M 1/64* (2006.01)
*H04M 1/56* (2006.01)
*H04M 15/06* (2006.01)

(52) U.S. Cl.
USPC ............... 370/352; 379/88.19; 379/142.06; 379/142.01

(58) Field of Classification Search ............... 379/88.19, 379/142.06, 142.01, 45, 266.1, 352; 370/352–356
See application file for complete search history.

(56) References Cited

U.S. PATENT DOCUMENTS

| 5,604,737 | A | 2/1997 | Iwami et al. |
| 6,842,512 | B2 * | 1/2005 | Pedersen ................. 379/142.01 |
| 6,888,927 | B1 | 5/2005 | Cruickshank et al. |
| 6,914,899 | B2 | 7/2005 | Siegrist et al. |
| 7,085,257 | B1 * | 8/2006 | Karves et al. ................. 370/352 |
| 7,385,992 | B1 * | 6/2008 | Koch et al. .................... 370/401 |
| 2002/0118807 | A1 * | 8/2002 | Pedersen .................. 379/142.01 |
| 2003/0026403 | A1 * | 2/2003 | Clapper ................... 379/142.06 |
| 2003/0215068 | A1 | 11/2003 | Stein et al. |
| 2003/0228007 | A1 * | 12/2003 | Kurosaki ................. 379/142.06 |
| 2004/0070627 | A1 * | 4/2004 | Shahine et al. ............... 345/794 |
| 2004/0264654 | A1 | 12/2004 | Reding et al. |
| 2005/0002510 | A1 | 1/2005 | Elsey et al. |
| 2005/0048958 | A1 * | 3/2005 | Mousseau et al. ............ 455/415 |
| 2005/0149876 | A1 | 7/2005 | Kortum et al. |

OTHER PUBLICATIONS

International Search Report and Written Opinion of the International Searching Authority, for International application No. PCT/US06/28595, mailed on Sep. 12, 2007.

* cited by examiner

*Primary Examiner* — Asad M Nawaz
*Assistant Examiner* — Nicholas Jensen
(74) *Attorney, Agent, or Firm* — Toler Law Group, PC

(57) ABSTRACT

A method of providing caller identification information to a voice over Internet protocol (VoIP) telephone device is disclosed and includes receiving an incoming telephone call. The method also includes determining a destination VoIP telephone device associated with the incoming call. Further, the method includes populating a caller identification portal with a plurality of identification characteristics from a caller profile and presenting the caller identification portal to a display of the destination VoIP telephone device. The caller identification portal can include a first mode in which a partial caller identification portal is presented and a second mode in which a full caller identification portal is presented.

22 Claims, 6 Drawing Sheets

SYSTEM AND METHOD OF PRESENTING CALLER IDENTIFICATION INFORMATION AT A VOICE OVER INTERNET PROTOCOL COMMUNICATION DEVICE

FIELD OF THE DISCLOSURE

The present disclosure relates to voice over Internet protocol telephone systems.

BACKGROUND

Caller identification services are ubiquitous in the public switched telephone network (PSTN). Typically, the caller identification services in the PSTN include a caller's ten-digit telephone number and in, some cases, up to thirteen text characters for a name. While this information is useful, it is limited in helping a user identify the caller. Further, the PSTN does not provide a way of storing or retrieving additional information about the caller.

Some Internet Protocol (IP) telephone systems have begun to include additional information. For example, one system can link a caller's name from a caller identification log with an entry in the user's electronic address book, if available. After the call has registered in the call log, the user can click on the caller's name to find out additional contact information, e.g., the caller's address or email address. This system is limited because it is only provided upon request by the user. Further, this system requires a user to be logged into a web site. Additionally, this current system is limited in the type and amount of information that is stored and retrievable.

DETAILED DESCRIPTION OF THE DRAWINGS

Figure 1:
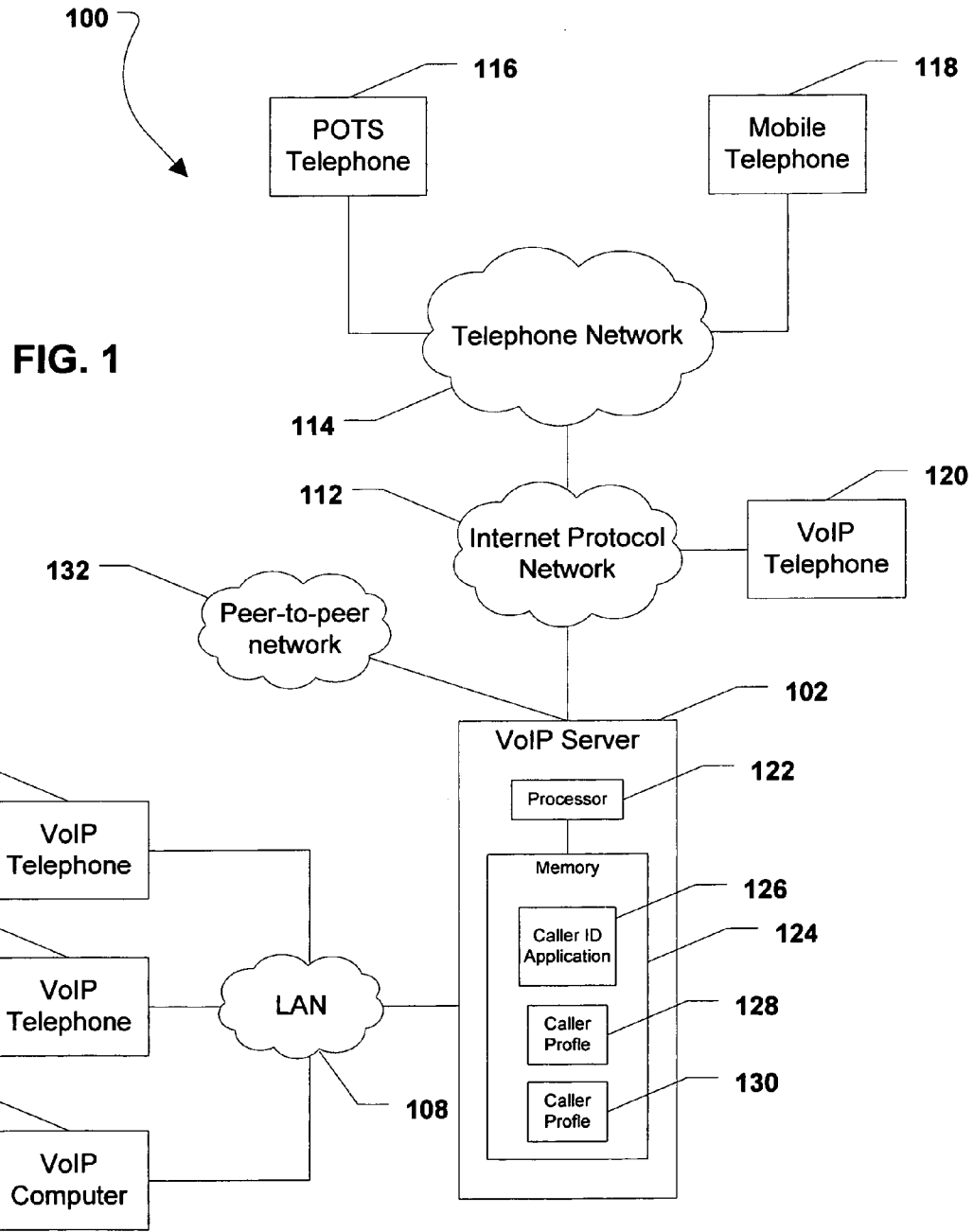
FIG. 1 is a block diagram that illustrates one embodiment of a voice over Internet protocol (VoIP) telephone system.

A method of providing caller identification information to a voice over Internet protocol (VoIP) telephone device is disclosed and includes receiving an incoming telephone call. The method also includes determining a destination VoIP telephone device associated with the incoming call. Further, the method includes populating a caller identification portal with a plurality of identification characteristics from a caller profile and presenting the caller identification portal to a display of the destination VoIP telephone device.

In a particular embodiment, the method also includes transferring the call to the destination VoIP telephone device. In another particular embodiment, the caller identification portal has a first mode in which a partial caller identification portal is presented and a second mode in which a full caller identification portal is presented.

In a particular embodiment, the method includes determining whether a user of the destination VoIP telephone device has enabled the first mode or the second mode of the caller identification portal. Moreover, the method includes presenting the partial caller identification portal when the first mode is enabled and presenting the full caller identification portal when the second mode is enabled.

In yet another particular embodiment, the method includes searching a network with an identified caller name, determining whether new information not included in the caller profile is available, and updating the caller profile when new information is available. In a particular embodiment, the network is at least one of the following: an Internet, a local area network, and a peer-to-peer network. Additionally, the network can be search using a telephone number, a social security number, or any other parameter associated with the identified caller.

In still another particular embodiment, the caller identification portal includes at least three of the following: a caller name, a caller work telephone number, a caller cellular telephone number, a caller facsimile number, a caller home telephone number, a caller work address, a caller home address, a caller universal resource locator, a caller work email address, a caller personal email address, a current time, a current date, a caller time zone, a caller summary information window, a previous call history from the caller, a previous call history to the caller, a list of upcoming meetings with the caller, an audio clip, a video clip, and a photograph.

In another embodiment, a voice over Internet protocol (VoIP) telephone system is disclosed and includes a VoIP server coupled to a remote VoIP communication device. The VoIP server includes a processor, a computer readable medium that is accessible to the processor, and a caller identification application that is embedded within the computer readable medium. Moreover, the caller identification application includes instructions to determine whether the remote VoIP communication device has a caller identification portal enabled, instructions to populate the caller identification portal with a plurality of identification characteristics from a caller profile associated with an identified caller, and instructions to present the caller identification portal on the VoIP communication device.

In yet another embodiment, a caller identification portal for a voice over Internet protocol (VoIP) communication device is disclosed and includes a plurality of identification characteristics. Further, the caller identification portal includes a full mode button and a partial mode button. When the full mode button is selected, a first set of the plurality of identification characteristics associated with an identified caller is displayed at the VoIP communication device during a call. Also, when the partial mode button is selected, a second set of the plurality of identification characteristics associated with the identified caller is displayed at the VoIP communication device during the call.

Figure 6:
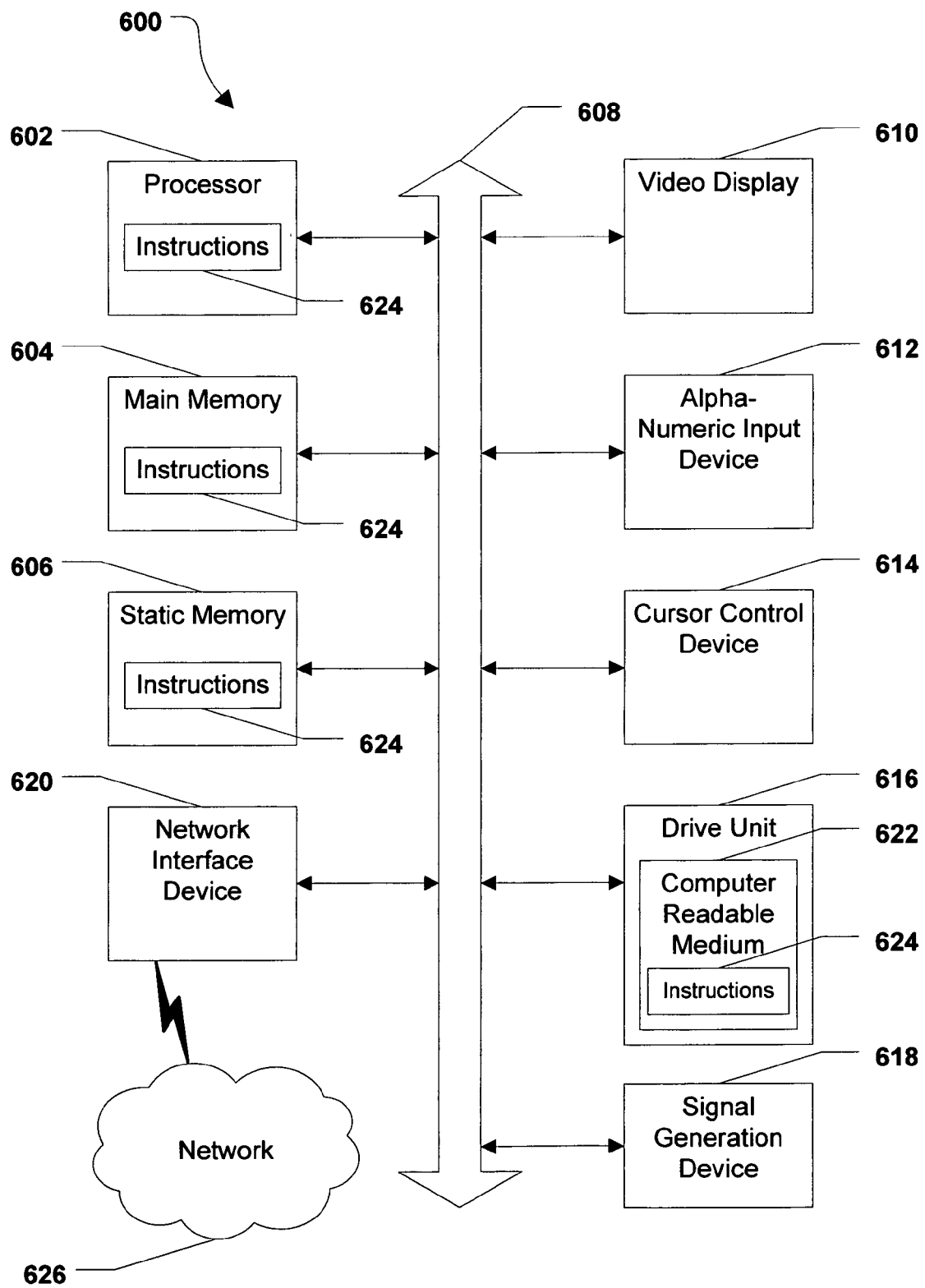
FIG. 6 is a block diagram that is representative of a general computer system.

FIG. 1 illustrates an exemplary, non-limiting embodiment of a voice over Internet protocol (VoIP) telephone system that is generally designated 100. As shown in FIG. 1, the system includes a VoIP server 102 that is coupled to a first VoIP telephone 104 and a second VoIP telephone 106 via a local area network (LAN) 108. Further, the VoIP server 102 can be coupled to a VoIP computer 110 via the LAN 108. FIG. 6, described below, depicts an exemplary non-limiting embodiment of a computing system that may be used as the VoIP server 102.

As indicated in FIG. 1, the VoIP server 102 can be coupled to an Internet protocol (IP) network 112. Further, the IP network 112 can be coupled to a telephone network 114, e.g., a public switched telephone network (PSTN) or a cellular telephone network. Accordingly, the telephone network 114 can provide connectivity from the VoIP server 102 to a plain old telephone service (POTS) telephone 116 or a cellular telephone 118. As illustrated in FIG. 1, a remote VoIP telephone 120 can be coupled to the IP network. As such, the IP network 112 can provide connectivity from the VoIP server 102 to the remote VoIP telephone 120.

In a particular embodiment, as shown in FIG. 1, the VoIP server 102 can include a processor 122 and a computer readable medium, e.g., a memory 124, that is accessible to the processor 122. As shown in FIG. 1, a caller identification application 126 can be embedded within the memory 124. Further, a first caller profile 128 and a second caller profile 130 can be stored within the memory 124. As shown in FIG. 1, the VoIP server 102 can also be coupled to a peer-to-peer network 132.

In a particular embodiment, the caller identification application 126 can identify incoming calls and populate a caller identification portal with information related to an identified caller. For example, when a caller is identified, the caller identification application 126 can retrieve a caller profile associated with the caller and populate the caller identification portal with information from the caller profile. Further, the caller identification application 126 can search one or more networks with the name of the identified caller in order to update the caller profile. Additionally, the caller identification application 126 can search the one or more networks with a social security number associated with the identified caller, a telephone number associated with the identified caller, an email address, or another search criteria associated with the identified caller.

In a particular embodiment, when a caller profile is not available for an identified caller, the caller identification application 126 can create a new caller profile for the identified caller. The caller profile can be populated with information available via one or more networks coupled to the VoIP server 102.

Figure 2:
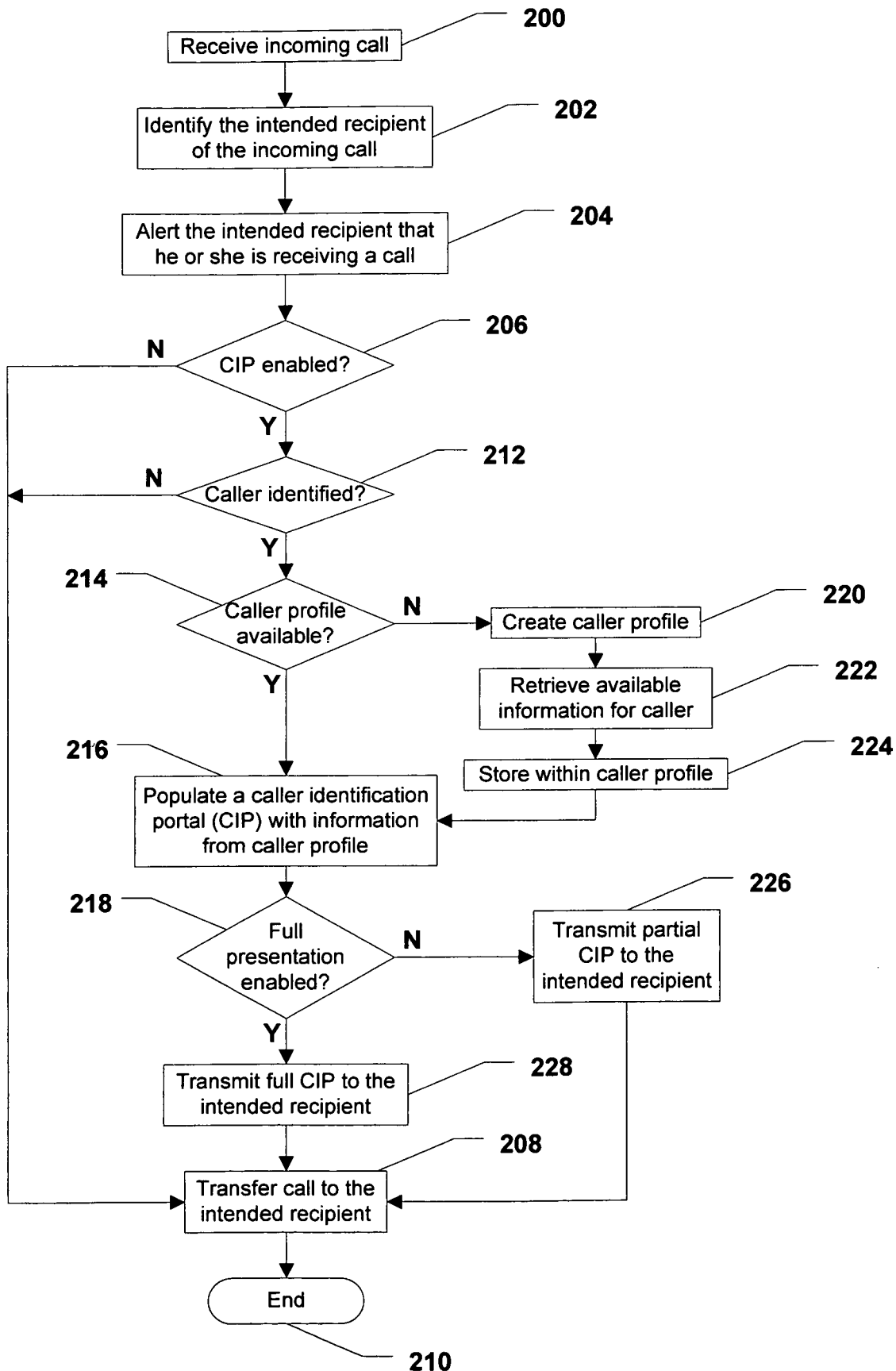
FIG. 2 is a flow chart illustrating a method of presenting caller identification information at a VoIP communication device.

Referring to FIG. 2, a method of presenting caller identification information at a VoIP communication device is shown and commences at block 200. At block 200, a VoIP server receives an incoming call. At block 202, the VoIP server identifies the intended recipient of the incoming call. Proceeding to block 204, the VoIP server alerts the intended recipient that he or she is receiving a telephone call. Moving to decision step 206, the VoIP server determines whether a caller identification portal (CIP) is enabled at a VoIP communication device associated with the intended recipient. In a particular embodiment, the VoIP communication device can be a VoIP server or a VoIP computer.

When the CIP is not enabled at the VoIP communication device, the method proceeds to block 208 and the telephone call is transferred to the intended recipient. The method then ends at state 210. At decision step 204, when the CIP is enabled at the VoIP communication device, the method proceeds to decision step 212. At decision step 212, the VoIP server determines whether a caller that originated the incoming call is identified. If the incoming caller is not identified, the method proceeds to block 208 and continues as shown. On the other hand, if the incoming caller is identified, the method proceeds to decision step 214.

At decision step 214, the VoIP server determines whether a caller profile is available for the identified caller. When a caller profile is available, the method moves to block 216 and the VoIP server populates a caller identification portal with information from the caller profile. The method then proceeds to decision step 218.

On the other hand when the caller profile is not available, the method continues to block 220 and the VoIP server creates a caller profile. At block 222, the VoIP server retrieves available information associated with the identified caller from one or more networks coupled to the VoIP server. In a particular embodiment, the VoIP server uses the name of the identified caller as a search query in order to locate the available information. Moving to block 224, the information is stored within the caller profile. For example, the caller profile can be stored within a computer readable medium, e.g., a memory within or accessible to the VoIP server. The method then proceeds to decision step 218.

At decision step 218, the VoIP server determines whether a full presentation mode is enabled at the VoIP communication device. If not, the method continues to block 226 and the VoIP server transmits a partial CIP to the VoIP communication device associated with the intended recipient of the telephone call. At block 208, the VoIP server transfers the call to the intended recipient. The method then ends at state 210.

At decision step 218, when full presentation is enabled at the VoIP communication device, the method moves to block 228 and the VoIP server transmits a full CIP to the VoIP communication device associated with the intended recipient of the telephone call. At block 206, the VoIP server transfers the call to the intended recipient. The method then ends at state 208.

In a particular embodiment, the method illustrated in FIG. 2 applies to calls received at a VoIP server over an IP network. However, the calls can include other types of communications that are received at a VoIP server via an IP network. For example, the calls can also include instant messages (IMs) that are received at the VoIP server.

Figure 3:
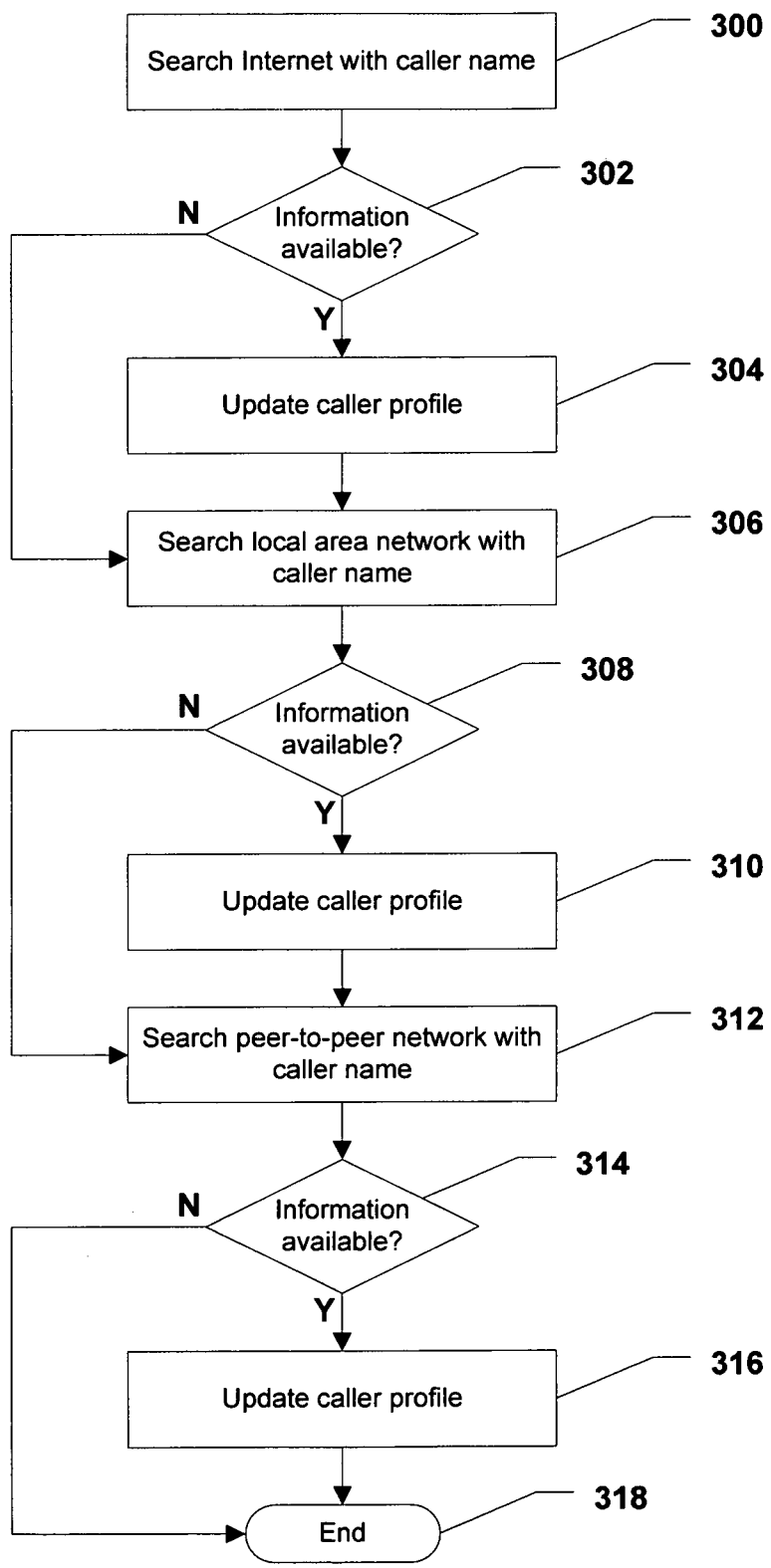
FIG. 3 is a flow chart illustrating a method of updating a caller profile.

FIG. 3 illustrates a method of updating a caller profile stored within a VoIP server. Beginning at block 300, the VoIP server searches a first network, such as the Internet, with a name of an identified caller. At decision step 302, the VoIP server determines whether any information is available for the identified caller. If so, the method proceeds to block 304 and the VoIP server updates a caller profile with the information. Then, the method moves to block 306. Returning to decision step 302, if no information is available via the network, the method moves to block 306.

At block 306, the VoIP server searches a second network, such as a local area network, with the name of the identified caller. Thereafter, at decision step 308, the VoIP server determines whether information is available for the identified caller. If so, the method proceeds to block 310 and the VoIP server updates the caller profile with the information. The method then moves to block 312. Returning to decision step 308, if no information is available via the second network, the method moves to block 312.

At block 312, the VoIP server searches a third network, such as a peer-to-peer network, with the name of the identified caller. Continuing to decision step 314, the VoIP server determines whether information is available for the identified caller via the peer-to-peer network. If so, the method proceeds to block 316 and the VoIP server updates the caller profile with the information. The method then ends at state 318. Returning to decision step 314, if no information is available via the third network, the method ends at state 318.

In a particular embodiment, a caller identification application within the VoIP server can be executed in order to perform one or more of the method steps described herein.

Figure 4:
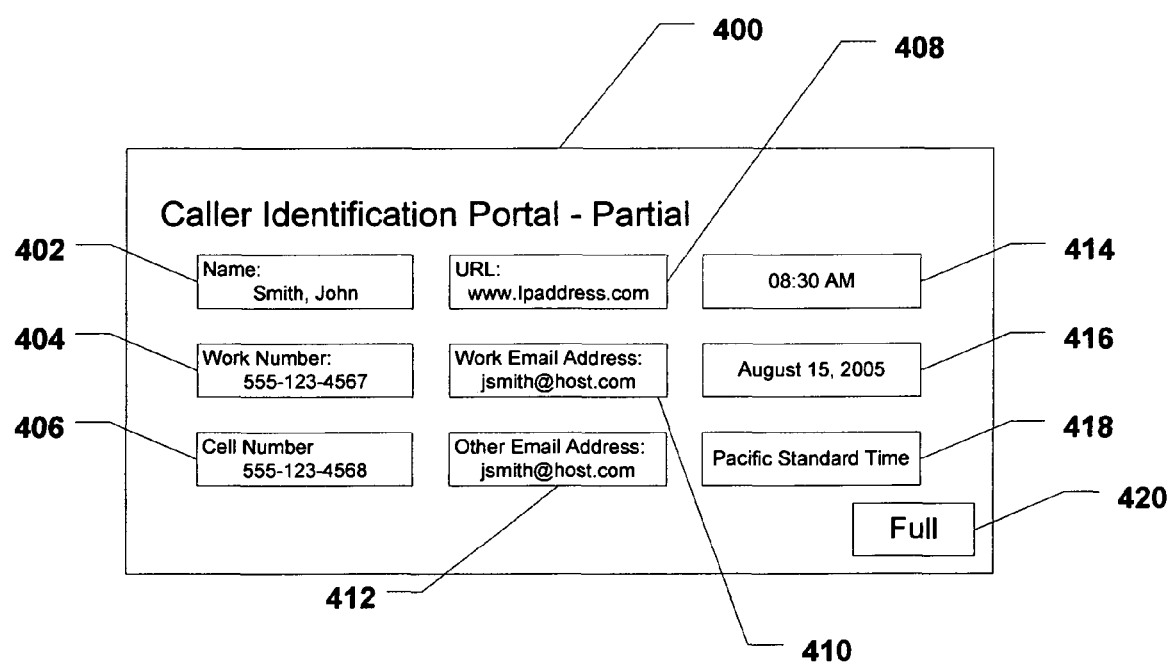
FIG. 4 is a general diagram that represents a partial caller identification portal.

FIG. 4 illustrates an exemplary, non-limiting embodiment of a partial caller identification portal, generally designated 400. In a particular embodiment, the partial caller identification portal (CIP) can be presented at a VoIP device having a relatively small display, e.g., a VoIP telephone. As depicted in FIG. 4, the partial CIP can include a caller name 402, a caller work telephone number 404, and a caller cellular telephone number 406. Further, the partial CIP can include a caller universal resource locator 408, a caller work email address 410, and a caller personal email address 412.

As shown in FIG. 4, the partial CIP can include a current time 414, a current date 416, and time zone 418 from which the caller is calling. Further, the partial CIP 400 can include a full mode button 420. In a particular embodiment, the full mode button 420 can be toggled in order to present a full CIP, e.g., the full CIP shown in FIG. 5. Additionally, in a particular embodiment, the information shown in the partial CIP can be retrieved from a caller profile. In a particular embodiment, not all information may be available from the caller profile. Accordingly, information that is not available may not be presented.

Figure 5:
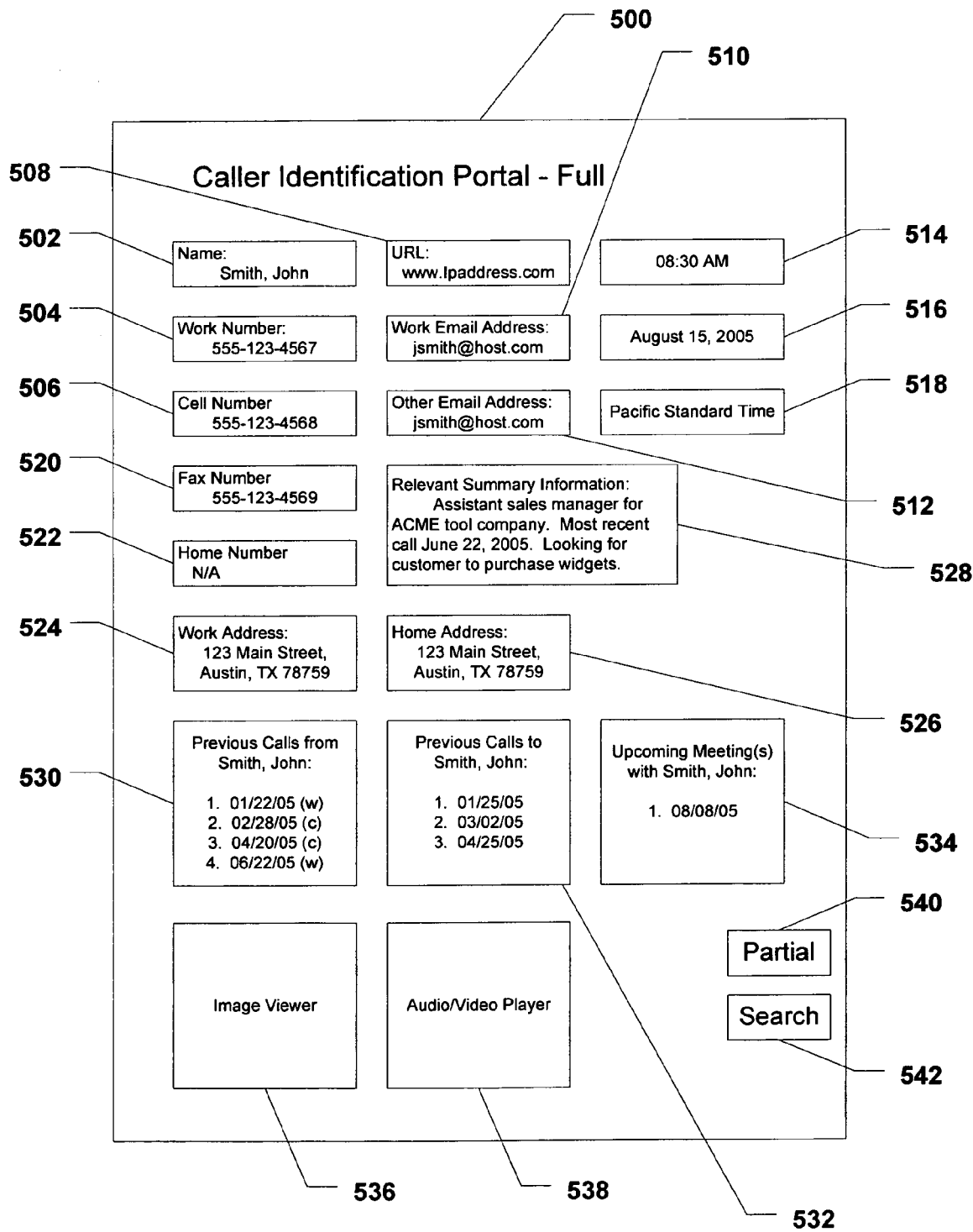
FIG. 5 is a general diagram that represents a full caller identification portal.

Referring to FIG. 5, a full caller identification portal is shown and is generally designated 500. In a particular embodiment, the full caller identification portal (CIP) can be presented at a VoIP device having a relatively large display, e.g., a VoIP computer. As depicted in FIG. 5, the full CIP can include a caller name 502, a caller work telephone number 504, and a caller cellular telephone number 506. Further, the full CIP can include a caller universal resource locator 508, a caller work email address 510, and a caller personal email address 512.

As shown in FIG. 5, the full CIP can also include a current time 514, a current date 516, and time zone 518 from which the caller is calling. Additionally, the full CIP 500 can include a caller facsimile number 520 and a caller home telephone number 522. Moreover, the full CIP 500 can include a caller work address 524 and a caller home address 526. The full CIP 500 can also include a summary of relevant information 528. For example, the summary of relevant information 528 can indicate the identified caller's position, company, most recent call, and a reason for the previous call.

FIG. 5 further indicates that the full CIP 500 can include a list of previous calls from the identified caller 530 and a list of previous calls to the identified caller 532. In a particular embodiment, the call lists can include calls to and from multiple telephone numbers that are associated with the identified caller. Further, the full CIP 500 can include a list of upcoming meetings with the identified caller 534. Additionally, the full CIP 500 can include an image viewer 536 in which one or more images associated with the identified caller can be displayed. For example, the image viewer within the full CIP 500 can present a graphical reminder associated with the caller, e.g., an icon, an avatar, an emoticon, a picture, etc. FIG. 5 also shows that the full CIP 500 can include an audio/video player 538 that can broadcast one or more audio files and/or one or more video files that are associated with the identified caller.

In a particular embodiment, an audio file that is associated with the identified caller can be played when the CIP 500 is presented to the user. For example, the user with a sense of humor may desire that the first movement of Beethoven's fifth symphony be played when someone ominous, e.g., a supervisor, is calling.

As shown in FIG. 5, the full CIP 500 can include a partial mode button 540. In a particular embodiment, the partial mode button 540 can be selected in order to present a partial CIP, e.g., the partial CIP shown in FIG. 4. In a particular embodiment, a user can use the full mode button 420 (FIG. 4) and the partial mode button 540 in order to move between the partial CIP 400 (FIG. 4) and the full CIP 500. FIG. 5 also shows that the full CIP 500 can include a search button 542 that can be selected in order to initiate a network search in order to update the profile presented via the full CIP 500.

In a particular embodiment, a user can customize the partial CIP 400 (FIG. 4) to include different elements than those that are shown in FIG. 4. For example, a user can customize the partial CIP 400 (FIG. 4) to include any combination of the elements that are shown in FIG. 5 as long as those elements fit within the physical confines of the partial CIP 400 (FIG. 4).

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of providing caller identification at a voice over Internet protocol (VoIP) communication device provides a way to automatically provide caller identification information to the VoIP communication device. Further, two modes of presentation can be provided. For example, in a full mode of presentation a plurality of identification characteristics can be provided to the VoIP communication device. Alternatively, in a partial mode of presentation a portion of the plurality of identification characteristics can be provided to the VoIP communication device. The mode of presentation can depend on a user preference or a size of a display at the VoIP communication device.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving an incoming telephone call from a caller;

determining a destination voice over Internet protocol telephone device associated with the incoming telephone call;

determining whether a caller profile associated with the caller is available, wherein determining whether the caller profile is available includes identifying the caller, wherein the caller profile includes a plurality of identification characteristics including at least one or more images associated with the caller, a most recent previous call from the caller, and a context of the most recent previous call;

in response to determining that the caller profile is not available, creating the caller profile;

searching at least two networks with at least one of a name of the identified caller, a telephone number of the identified caller, a social security number of the identified caller, and an email address of the identified caller to determine whether new information not included in the caller profile is available from one or more of the at least two networks, wherein the at least two networks include at least one of an Internet, a local area network, and a peer-to-peer network;

updating the caller profile with new information in response to a determination that the new information is available;

populating a caller identification portal based on whether one of a full mode button and a partial mode button has been selected, wherein the caller identification portal is populated with all of the plurality of identification characteristics included in the caller profile when the full mode button has been selected, wherein the caller identification portal is populated with a subset of the plurality of identification characteristics when the partial mode button has been selected, wherein the subset comprises one or more identification characteristics of the plurality of identification characteristics, wherein the full mode button is not displayed in response to the selection of the full mode button, and wherein the partial mode button is not displayed in response to the selection of the partial mode button; and presenting the caller identification portal to a display of the destination voice over Internet protocol telephone device.

2. The method of claim 1, further comprising transferring the incoming telephone call to the destination voice over Internet protocol telephone device.

3. The method of claim 1, wherein the caller identification portal is populated with the one or more images associated with the caller when the partial mode button is selected.

4. The method of claim 1, wherein updating the caller profile comprises:
storing the new information in the caller profile.

5. The method of claim 1, wherein the plurality of identification characteristics further includes at least one of the following: a caller name, a caller work telephone number, a caller cellular telephone number, a caller facsimile number, a caller home telephone number, a caller work address, a caller home address, a caller universal resource locator, a caller work email address, a caller personal email address, a current time, a current date, a caller time zone, a caller summary information window, a previous call history from the caller, a previous call history to the caller, a list of upcoming meetings with the caller, an audio clip, a video clip, a photograph, and a search button.

6. The method of claim 1, wherein the context of the most recent previous call includes a reason for the most recent call, and wherein the plurality of identification characteristics further includes a list of upcoming meetings with the caller.

7. The method of claim 1, wherein the plurality of identification characteristics further includes a list of previous calls from the caller, wherein the list of previous calls from the caller identifies calls from multiple telephone numbers that are associated with the caller.

8. The method of claim 1, wherein the plurality of identification characteristics further includes a list of previous calls to the caller, wherein the list of previous calls to the caller identifies calls to multiple telephone numbers that are associated with the caller.

9. The method of claim 1, further comprising:
in response to receiving information indicating a selection of a search button displayed at the caller identification portal, populating the caller identification portal at the display of the destination voice over Internet protocol telephone device using updated information, wherein the updated information is determined based on a network search for additional identification characteristics associated with the caller and new identification characteristics associated with the caller.

10. The method of claim 1, wherein the subset of identification characteristics is configurable.

11. The method of claim 10, further comprising adding one or more additional identification characteristic to the subset of identification characteristics.

12. The method of claim 10, further comprising removing one or more identification characteristic from the subset of identification characteristics.

13. A voice over Internet protocol server, comprising:
a processor;
a computer-readable device accessible to the processor; and
a caller identification application embedded within the computer-readable device, the caller identification application comprising instructions to:
determine whether a remote voice over Internet protocol communication device has a caller identification portal enabled, the remote voice over Internet protocol communication device coupled to the voice over Internet protocol server;
determine whether a caller profile associated with the caller is available, wherein determining whether the caller profile is available includes identifying the caller, wherein the caller profile includes a plurality of identification characteristics including at least one or more images associated with the caller, a most recent previous call from the caller, and a context of the most recent previous call;
in response to determining that a caller profile is not available, create the caller profile;
search at least two networks with at least one of a name of the identified caller, a telephone number of the identified caller, a social security number of the identified caller, and an email address of the identified caller to determine whether new information not included in the caller profile is available from one or more of the at least two networks, wherein the at least two networks include at least one of an Internet, a local area network, and a peer-to-peer network;
update the caller profile with new information in response to a determination that the new information is available;
populate the caller identification portal based on whether one of a full mode button and a partial mode button has been selected, wherein the caller identification portal is populated with all of the plurality of identification characteristics included in the caller profile when the full mode button has been selected, wherein the caller identification portal is populated with a subset of the plurality of identification characteristics included in the caller profile when the partial mode button has been selected, wherein the subset comprises at least one identification characteristic of the plurality of identification characteristics and less than all of the plurality of identification characteristics, wherein the full mode button is not displayed in response to the selection of the full mode button, and wherein the partial mode button is not displayed in response to the selection of the partial mode button; and initiate presentation of the caller identification portal on the remote voice over Internet protocol communication device.

14. The voice over Internet protocol server of claim 13, wherein the caller identification portal is populated with the one or more images associated with the caller when the partial mode button is selected.

15. The voice over Internet protocol server of claim 13, wherein the remote voice over Internet protocol communication device is one of a voice over Internet protocol telephone and a voice over Internet protocol computer.

16. The voice over Internet protocol server of claim 13, wherein the plurality of identification characteristics further includes a list of upcoming meetings with the identified caller, a list of previous calls from the identified caller, and a list of previous calls to the identified caller.

17. The voice over Internet protocol server of claim 16, wherein the list of previous calls from the identified caller identifies calls from multiple telephone numbers that are associated with the identified caller, and wherein the list of previous calls to the identified caller identifies calls to multiple telephone numbers that are associated with the identified caller.

18. The voice over Internet protocol server of claim 13, wherein the caller identification application further comprises instructions to:

in response to determining that the caller profile is not available, search at least one network with at least one of a name of the identified caller, a telephone number of the identified caller, a social security number of the identified caller, and an email address of the identified caller, wherein the at least one network includes at least one of an Internet, a local area network, and a peer-to-peer network;

receive information from the at least one network in response to the search;

create the caller profile based on the received information associated with the identified caller; and associate the caller profile with the identified caller.

19. A caller identification portal for a voice over Internet protocol (VoIP) communication device, the caller identification portal comprising:

a plurality of identification characteristics associated with an identified caller, wherein the plurality of identification characteristics includes one or more images associated with the identified caller, a most recent previous call from the identified caller, and a context of the most recent previous call;

a full mode button;

a partial mode button; and a search button, wherein, in response to a selection of the full mode button, the caller identification portal is updated to display each of the plurality of identification characteristics and to display the partial mode button, wherein, in response to a selection of the partial mode button, the caller identification portal displays a subset of the plurality of identification characteristics and displays the full mode button, wherein the subset comprises at least one of the plurality of identification characteristics, wherein the identification characteristics displayed at the caller identification portal are updated based on information obtained during a search of at least two networks initiated in response to a selection of the search button, wherein the at least two networks are searched using at least one of a name of the identified caller, a telephone number of the identified caller, a social security number of the identified caller, and an email address of the identified caller, wherein the at least two networks include at least one of an Internet, a local area network, and a peer-to-peer network, wherein the full mode button is not displayed in response to the selection of the full mode button, and wherein the partial mode button is not displayed in response to the selection of the partial mode button.

20. The caller identification portal of claim 19, wherein the plurality of identification characteristics further includes at least one of the following: a caller name, a caller work telephone number, a caller cellular telephone number, a caller facsimile number, a caller home telephone number, a caller work address, a caller home address, a caller universal resource locator, a caller work email address, a caller personal email address, a current time, a current date, a caller time zone, a caller summary information window, a previous call history from the identified caller, a previous call history to the identified caller, a list of upcoming meetings with the identified caller, an audio clip, a video clip, a photograph, and a search button.

21. The caller identification portal of claim 20, wherein the previous call history from the identified caller includes calls from multiple telephone numbers that are associated with the identified caller.

22. The caller identification portal of claim 20, wherein the previous call history to the identified caller identifies calls to multiple telephone numbers that are associated with the identified caller.

* * * * *